United States Statutory Invention Registration [19]

[11] Reg. Number: H393

Burt [43] Published: Dec. 1, 1987

[54] TELEVISION TEST SIGNAL GENERATOR

[75] Inventor: Carolyn S. Burt, Huntsville, Ala.

[73] Assignee: The United States of America as represented by the Secretary of the Army, Washington, D.C.

[21] Appl. No.: 57,134

[22] Filed: May 18, 1987

[51] Int. Cl.[4] ..... H04N 17/00

[52] U.S. Cl. ..... 358/139

*Primary Examiner*—Stephen C. Buczinski
*Assistant Examiner*—Linda J. Wallace
*Attorney, Agent, or Firm*—John C. Garvin, Jr.; Freddie M. Bush; Robert C. Sims

[57] ABSTRACT

An Erasable Programmable Read Only Memory (EPROM) is coupled to two counters which are driven by a crystal clock oscillator. The EPROM has selectable outputs which are multiplexed, converted and fed to video equipment, whereby test patterns can be generated for adjustment of their analog circuits.

3 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TELEVISION TEST SIGNAL GENERATOR

DEDICATORY CLAUSE

The invention described herein may be manufactured, used, and licensed by or for the Government for governmental purposes without the payment to me of any royalties thereon.

BACKGROUND OF THE INVENTION

Almost all video devices (television monitors, video recorders, etc.) are analog in nature and so require periodic adjustments. In order to perform these adjustments properly, a video signal generator is required. Although some adjustments require complex test patterns which require an expensive ($10,000 or more) video signal generator, most of the common adjustments can be made with one or two single test patterns such as a crosshatch or pure white screen. This invention describes a simple video test signal generator which generates two selectable test patterns. It is crystal controlled for accuracy, expandable, and is small and inexpensive enough to be enclosed in almost any piece of video equipment which needs periodic adjustments. This invention differs from previous inventions in its field by the unique way the Erasable Programmable Read Only Memory (EPROM) has been used. The EPROM is used not only to generate the active video (as in other designs) but also to generate the horizontal and vertical blanking and sync pulses. Thus, by simply changing the EPROM, any video format (RS170, 330, 343*a*) can be generated. Overall, this Complimentary Metal-Oxide Semiconductor (CMOS) design used six integrated circuits and the EPROM can be replaced with any EPROM or Read Only Memory (ROM) one wishes to use. A typical video circuit using an EPROM is illustrated in Modern Electronic Circuits Reference Manual by John Markus, copyright 1980 by McGraw-Hill in the television circuits section under ATV CAll generator on page 1030. This design is typical of known existing designs which use the ROM to generate only active video and use other circuitry to generate the sync and blanking signals. However, by combining the sync, blanking, and active video into a single EPROM a considerable savings in circuitry is possible. This, together with the ability to change the video format by simply changing the EPROM, makes this a unique invention.

SUMMARY OF THE INVENTION

The invention is a television test signal generator which can be used for a variety of television test purposes. The heart of the generator is a user programmable EPROM that can be used to generate virtually any video format. What is new is that the sync, blanking, and active video are combined into a single EPROM resulting in minimal circuitry.

DETAILED DESCRIPTION OF THE INVENTION

Figure 1:
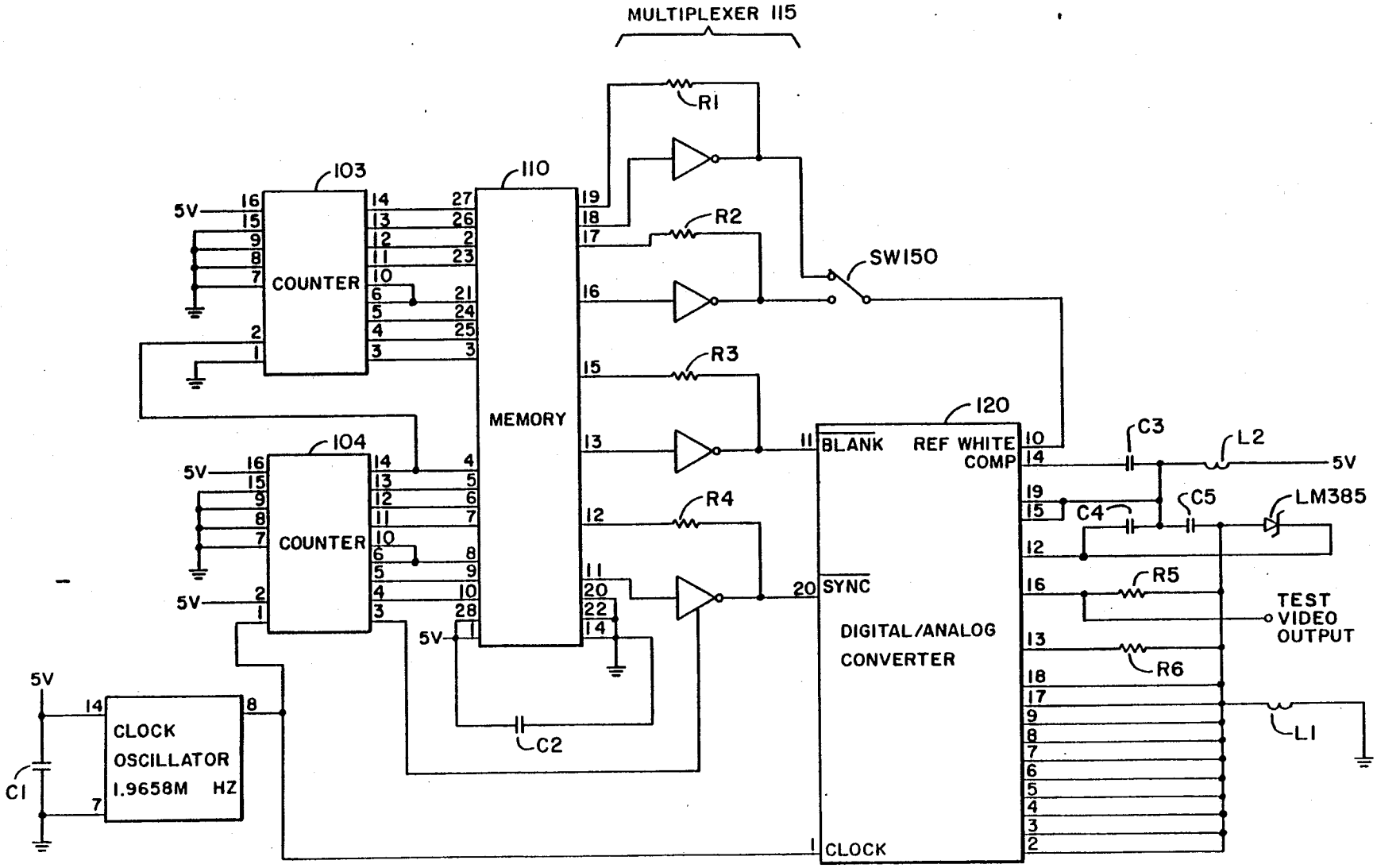
FIG. 1 is a diagram of the present invention.
Figure 2:
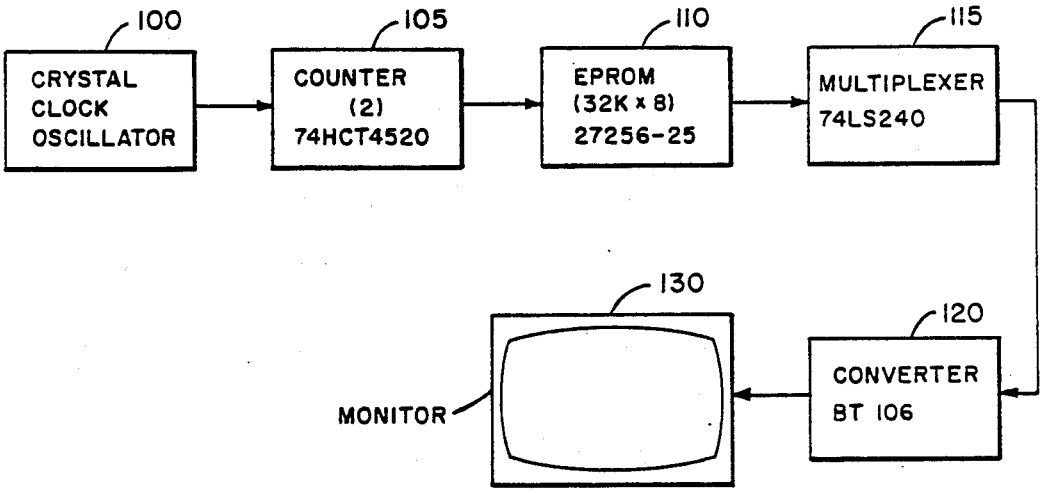
FIG. 2 is a diagram of the present invention.

The invention is a television test signal generator shown in FIGS. 1 and 2 which can be used for a variety of television test purposes. The heart of the generator is a user programmable EPROM 110 that can be used to generate virtually any video format. The sync, blanking, and active video are combined into a single EPROM resulting in minimal circuitry. This invention can be used wherever a television test signal generator is required and is especially useful in situations where one may wish to change video formats or the displayed test pattern. This invention uses a minimum of parts and thus its small size makes it possible to be embed in television equipment such as television monitors, cameras, etc. Initially, a clock oscillator 100 generates clock pulses which are fed into two synchronous four-stage counters 103 and 104 (105 FIG. 1)(Chip #74HCT4520). These counters generate sequential addresses which are fed to the EPROM 110. This EPROM (Chip #27256-25) whose organization is 32K×8 bits wide, yields an eight bit output which is demultiplexed into two four bit fields to give an effective 64k of four bit words. Since only four of the output bits are needed at a time, the multiplexer 115 selects the proper four. These four bit words are then fed to a video Digital to Analog Converter (DAC) 120 which outputs composit analog video to the monochrome or RGB (Red, Green, Blue) inputs of a television.

The (Brooktree) BT106 DAC 120 is an 8-bit, monolithic CMOS, 50 MHz, VIDEODAC which takes the logic level inputs from the EPROM 110 and converts them to RS-343-A compatible output. It directly drives 75-ohm loads and will accept up to eight data inputs giving a possible 256 grey shades. The fact that it has separate sync and blanking inputs simplifies the design (other devices use external sources for the blanking and sync levels). It is significant to note that in this invention the logic signals driving the BT106 come from the EPROM. Although the BT106 has available eight data lines, DO–D7, designating DO as the least significant bit (LSB) and D7 as the most significant bit (MSB), they are unused in this invention but are accessible for use if needed. The output can be fed to a monitor 130 or other video equipment.

I claim:

1. A television test generator comprising a clock means having an output, a counter having an input and an output, said input of said counter being connected to the output of the said clock means, and Erasable Programmable Read Only Memory (EPROM) having inputs and outputs, said EPROM having its inputs connected to the outputs of said counter means, a digital to analog converter having inputs connected to the outputs of the said EPROM whereby outputs of said converter will generate test video signals.

2. A generator as set forth in claim one wherein said counter means comprises first and second counters.

3. A generator as set forth in claim two further comprising a switch means connected between said EPROM and said digital to analog converter whereby different test patterns can be obtained.

* * * * *